May 28, 1935.  W. H. FARR  2,003,109
WHEEL STRUCTURE
Filed May 27, 1932
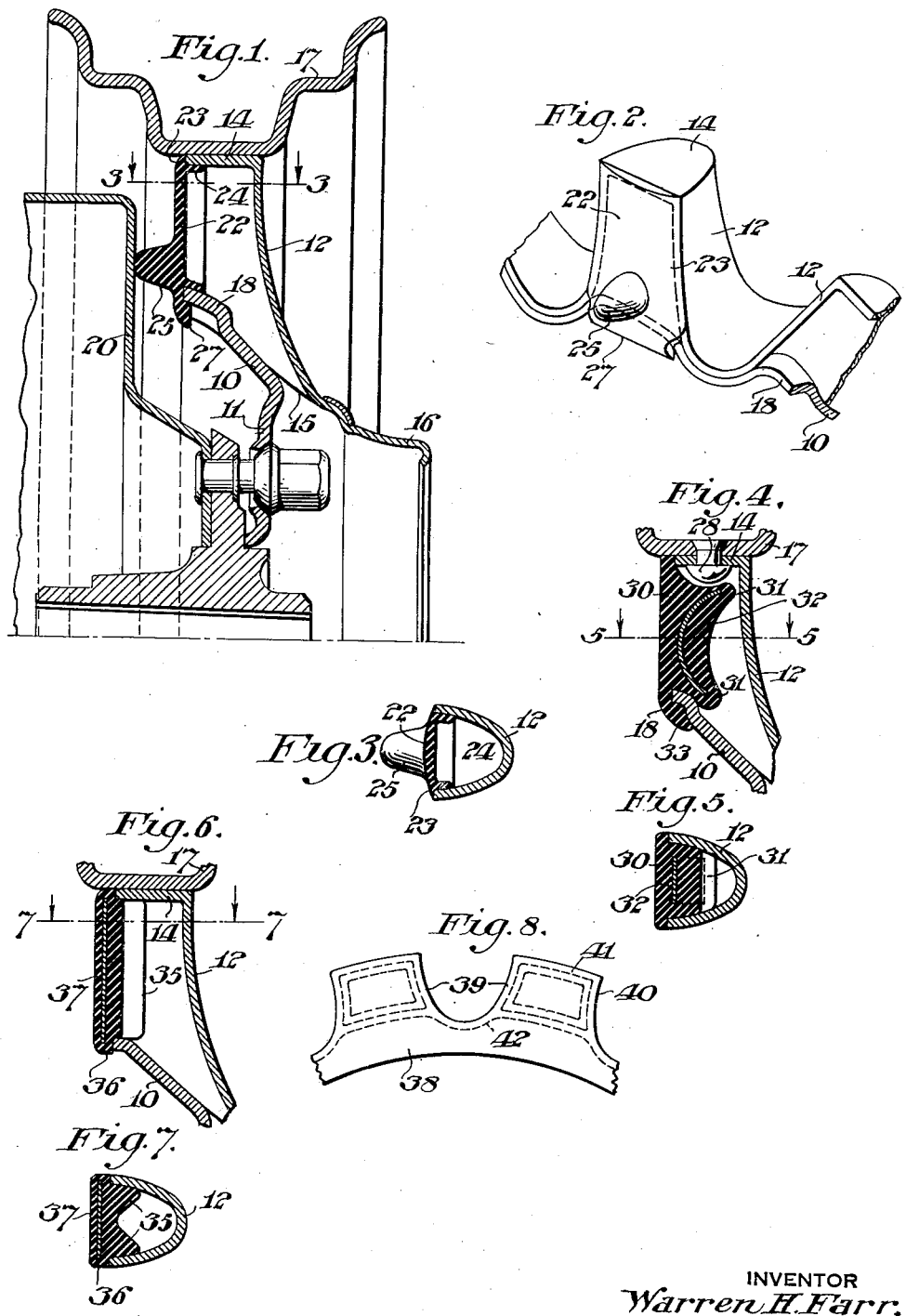
INVENTOR
*Warren H. Farr,*
BY
*John P. Tarbox*
ATTORNEY

UNITED STATES PATENT OFFICE 2,003,109

WHEEL STRUCTURE

Warren H. Farr, Detroit, Mich., assignor to Budd Wheel Company, Philadelphia, Pa., a corporation of Pennsylvania Application May 27, 1932, Serial No. 613,842

20 Claims. (Cl. 301—6)

My invention relates to wheels and particularly to pressed sheet-metal wheels of the artillery type.

Objects of my invention are to reduce the weight, to preclude the necessity for certain welding, to seal open sections, to dampen vibrations and to facilitate the assembly of wheels of the above-indicated character.

A further object of the invention is to provide a wheel that shall be simple and durable in construction, economical to manufacture and effective in its operation.

Elements of the combination, employed before my invention, include a sheet-metal stamping having rearwardly-opening spokes of channel-section, closure plates for the outer ends of the spokes, a conical member closing the inner ends of the spokes, and a brake drum.

In practicing my invention, I provide non-metallic or yieldable elements, preferably of rubber, to close the open rear sides of the spokes. These elements may be of various shapes, reinforced in various ways and secured in position by any one of several means.

A purpose being to reduce the weight of the wheel and to preclude the necessity for welding certain parts, the closure elements are primarily non-metallic. Another purpose being to dampen vibration, the elements are preferably of yielding non-metallic material, or have such material associated therewith and since a still further object is to seal the open spokes, the elements are of material and construction to accomplish this end.

The elements may be of flat-plate character having cover flanges or reinforcing ribs. They may be suitably reinforced and stiffened, as by embedded plates. They may be joined to the metal, as by vulcanizing and pre-treating the metal for this purpose.

They may be removably held in position, as by snap-fastening ears, of rubber or other material, and reinforced, or made more resilient, by springs embedded therein, or otherwise related thereto. They may be wedgingly placed, or placed under compression, between certain parts to dampen vibrations and may, in general, be variously modified in accordance with the purposes of the invention, as will hereinafter appear.

Figure 1 of the accompanying drawing, is an axial section of one-half of a wheel constructed in accordance with my invention, showing a portion of a brake drum associated therewith.

Fig. 2 is a detail perspective view of a portion of the device shown in Fig. 1,

Fig. 3 is a view, in section, of a spoke and cover device embodied in the invention, taken substantially along the line 3—3 of Fig. 1, Figs. 4 and 6 are views, similar to portions of Fig. 1, of modified forms of the invention, Figs. 5 and 7 are views, similar to Fig. 3, having corresponding relation to Figs. 4 and 6, respectively, that Fig. 3 has to Fig. 1, and Fig. 8 is a detail view, in side elevation, of a portion of a further modified form of the invention.

Referring particularly to Figs. 1, 2 and 3, a wheel, for which my invention is adapted, comprises, in general, a pressed-metal load-sustaining element including a conical portion 10 and a mounting-plate portion 11 having axial openings therein for receiving mounting bolts to secure the structure to a hub flange.

A metal stamping, preferably of stainless steel, comprises hollow spokes 12 preferably of rearwardly-opening channel-section, outer-end closure plates or elements 14 for the spokes 12, a conical portion 15, fitting a portion of the outer surface of the cone 10, and a hub-cap-receiving portion 16. A preferably pressed-metal rim 17, shown as of the drop-center type, may be secured to the spoke end plates 14, as by projection welding. The outer perimeter 18 of the cone 10 is slightly radially offset from the remainder of the cone and of wave-like character, in a plane parallel to the wheel plane, to fit the inwardly-flaring inner ends of the spokes 12 and the rounded portions of the cone 15 between the spokes.

A brake drum member 20 is suitably secured to the wheel and has a portion or head, in a plane parallel to the load plane of the wheel, in slightly axially spaced relation to the spokes 12.

A closure member, of my invention, preferably constructed of yieldable non-metallic material, such as rubber, comprises a wall portion 22 and outer and inner radial and axial perimetral flanges 23 and 24, respectively, fitting axial and radial surfaces of the plate 14, the spoke 12 and the portion 18. These surfaces may be of a material suitable for vulcanizing to rubber or may be treated chemically, as by etching or they may be roughened, electro-plated or otherwise prepared. Also, liquid agents, such as varnish, cements and other compositions, may be utilized in securing the closure elements in position.

The wall 22 may be provided with an axiallyinwardly-extending projection 25 compressed, or wedgingly held, against the brake drum 20, to assist in holding the parts together and to dampen vibrations. The wall 22 conforms to the downwardly diverging sides of its spoke 12 and is provided, at its inner extremity, with a flap or flange 27 embracing the portion 18.

In the other figures corresponding parts are designated by corresponding reference characters.

In Figs. 4 and 5, the rim 17, instead of being welded to the plate 14 is riveted thereto by a rivet having an inwardly projecting head 28. This head and the offset portion 18 of the cone 10 constitute substantially overhanging or locking portions at the outer and inner ends of the spoke, respectively.

In this structure, the closure member, at the open inner side of the spoke, similarly has a front wall 30 but is provided with an inner projection providing ears or locking portions 31 for overhanging relation to the rivet head 28 and the portion 18. A small arcuate leaf spring 32 is associated with the closure element, preferably embedded therein, to reinforce the ears 31 and to render the same more permanently resilient. The ears 31 and the portions 28 and 18 constitute substantially snap-fastening means whereby the closure member may be inserted by a thrust movement, securely held in place and readily removed. An inner flap 33 is preferably biased to assume a close-fitting embracing relation to the cone 10, as illustrated.

Referring to Figs. 6 and 7, the closure member for the inner open side of the spoke is provided with longitudinal or radial flanges 35 fitting the sides of the spoke and with a perimetral flange 36. A preferably flat-plane metal plate 37 is embedded in the outer wall portion of the closure member and preferably extends laterally, or in a plane parallel to the wheel plane, beyond the edges of the plate 14, the spoke 12 and the cone 10. The yieldable material of the cover is thereby reinforced against axial forces from the exterior thereof towards the spoke.

In the form of my invention illustrated in Fig. 8, closure elements 39 for the rear sides of the spokes, instead of being individual elements, as in the previously-described figures, are joined by a ring 38 and provided with perimetral flanges 40 and substantially channel portions 41 conforming to the side and end elements of the spokes. The ring 38 may also be provided with a perimetral flange 42 conforming to the portion 18 illustrated in the previous figures.

While I have shown and described particular forms of my invention, changes may be effected therein without departing from the spirit and scope thereof as set forth in the appended claims.

What I claim is:

1. A wheel comprising a metal spoke of channel-section and a rubber closure member therefor vulcanized thereto.

2. A wheel comprising a metal spoke of channel-section and a closure member therefor having a yieldable axial projection extending away from the spoke.

3. A wheel comprising metal spokes of channel-section and a non-metallic member including a ring and radial projections constituting closures for the spokes.

4. A wheel comprising metal spokes of channel-section and a molded-rubber ring including radial projections closing the spokes and having perimetral flanges fitting the edges of the spokes.

5. A wheel comprising a metal spoke of channel-section, a yieldable closure member therefor and a reinforcing element for the yieldable member.

6. A wheel comprising a metal spoke of channel-section, a yieldable closure member therefor and a reinforcing element embedded in the yieldable member.

7. A wheel comprising a metal spoke of channel-section and a closure member therefor including a resilient portion for locking the member to the spoke.

8. A wheel comprising a metal spoke of hollow-section having an open side and overhanging inner portions, and means closing said side and having substantially snap-fastening means co-operating with said overhanging portions for holding the closure means in position.

9. A wheel comprising a conical nave, a rim, a hollow spoke having an open side, means securing the spoke to the rim including a rivet having a head in the spoke, and a closure member for the open side of the spoke including resilient elements for substantially snap-fastener co-operation with said rivet head and the outer perimeter of the nave for holding the closure member in position.

10. A wheel comprising a spoke of channel-section, elements closing the spoke at its ends, a cover of yieldable material for the open side of the spoke and having angularly-related perimetral seats fitting axial and wheel-plane surfaces of the spoke and said elements, and a stiffening plate embedded in the cover and laterally overlapping the adjacent edges of the spoke and said elements parallel to the plane of the wheel.

11. In combination, in a wheel, a body including a spoke of rearwardly-opening hollow section, a brake drum having a portion axially spaced from said spoke, and a non-metallic closure member for the opening in the spoke disposed under compression between the spoke and said brake-drum portion.

12. In combination, in a wheel, a body including a spoke of rearwardly opening channel section, a brake drum having a portion disposed in slightly rearwardly spaced relation thereto, and a closure for the open rear side of the spoke having a yieldable axial projection engaging said brake drum portion.

13. A wheel comprising a pressed-sheet metal spoke of hollow section having a side opening and surfaces about the opening treated to receive a rubber closure member therefor, and a rubber closure member vulcanized to said treated surfaces.

14. A wheel comprising a spoke of rearwardly opening channel section, an element closing the inner end thereof and a yieldable closure member for the open rear side of the spoke having an inner end flap embracing said element.

15. A wheel comprising a plurality of hollow channel sectioned metal spoke portions and rubber closure members closing the open sides of said hollow channel spoke portions.

16. A vehicle wheel comprising metal spokes of channel section and rubber closure members intimately united to said spokes and forming therewith spoke bodies of hollow section.

17. A wheel comprising metal spokes of channel section and rubber closure members therefor and intimately sealed thereto, forming spokes of hollow section.

18. A vehicle wheel comprising metal spokes of channel section having open sides and rubber cover members therefor having angularly related perimetrally-grooved seat portions fitting cooperating axial and wheel plane surfaces of said spokes whereby to form spoke bodies of hollow section.

19. A vehicle wheel comprising metal spokes of channel section, integral spoke end portions closing the ends thereof, and rubber covers for the open sides of said spokes each including a continuous perimetrally-grooved seat having angularly related portions fitting axial and wheel plane surfaces of each spoke, side walls and end portions and forming spokes of hollow section.

20. In combination in a vehicle wheel, a body including a spoke of rearwardly-opening hollow section, a brake drum having a portion axially spaced rearwardly from said spoke, and a separately formed closure member for the opening in the spoke including a portion bridging the axial space between the spoke and said brake drum portion.

WARREN H. FARR.